(12) United States Patent
Blodgett et al.

(10) Patent No.: US 6,901,108 B2
(45) Date of Patent: May 31, 2005

(54) APPARATUS AND METHOD FOR ADAPTIVE CONTROL

(75) Inventors: James Russell Blodgett, Walnut Creek, CA (US); Gerald L. Frazer, Atkinson, NH (US); Michael W Goodwin, North Andover, MA (US); Karen E. Leonard, Salem, NH (US); James P Moffatt, Salem, NH (US); Fan Zhang, Haverhill, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 783 days.

(21) Appl. No.: 09/849,852

(22) Filed: May 4, 2001

(65) Prior Publication Data

US 2002/0163960 A1 Nov. 7, 2002

(51) Int. Cl.$^7$ .............................................. H03K 5/159
(52) U.S. Cl. ....................... 375/232; 375/347; 375/150; 375/149; 375/147; 329/316; 341/140; 341/50
(58) Field of Search ................................. 375/232, 149, 375/347, 150, 147; 329/316; 341/143, 140, 50

(56) References Cited

U.S. PATENT DOCUMENTS

| | | | | |
|---|---|---|---|---|
| 4,279,018 A | * | 7/1981 | Frosch et al. ............... | 375/149 |
| 4,616,308 A | | 10/1986 | Morshedi et al. ........... | 364/159 |
| 5,179,575 A | * | 1/1993 | Pierce et al. ................ | 375/232 |
| 5,283,531 A | * | 2/1994 | Serizawa et al. ............ | 329/316 |
| 6,473,019 B1 | * | 10/2002 | Ruha et al. ................. | 341/143 |

FOREIGN PATENT DOCUMENTS

GB          1 257 779 A    12/1971    ........... G05B/13/00

OTHER PUBLICATIONS

Frazer G. L., et al.: "Static and Dynamic Performance of an Adaptive Receiver for 10 Gbps Optical Transmission," ECOC 2000, 26$^{th}$ European Conference on Optical Communication, Proceedings of 26$^{th}$ European Conference on Optical Communication, Munich, Germany, Sep. 3–7 2000, vol. 2, pp. 113–114, XP008007898 2000, Berlin, Germany, VDE Verlag, Germany.

* cited by examiner

*Primary Examiner*—Shuwang Liu
*Assistant Examiner*—Eva Zheng

(57) ABSTRACT

An adaptive controller generates a sequence of dither signals for each of a plurality of control parameters. Each dither signal sequence is uncorrelated with every other dither signal sequence. Each nominal control signal has the first of its respective dither signal values simultaneously summed with it to form the control parameter values used by the controller. Updated control signals are applied in parallel to the controller outputs and a performance measure is taken and stored. The second signals in the dither control sequences are then summed with their respective nominal controls and applied in parallel to the controller and a second performance measure is taken and stored. This process is repeated for the length of the dither control signal sequence to yield a sequence of performance measurements. The sequence of performance measurements is correlated with each of the dither sequences, forming sequences of correlator outputs, one for each control signal. Each correlator output sequence is integrated and, depending upon the value of a correlator's integration output, the corresponding nominal signal has it's dither value added to or subtracted from it to form the respective, updated control values.

19 Claims, 6 Drawing Sheets

FIG. 5A

| $+\Delta_1$ | $-\Delta_1$ |
|---|---|
| $+\Delta_2$ | $-\Delta_2$ |
| ⋮ | ⋮ |
| $+\Delta_j$ | $-\Delta_j$ | i = 16 j = 4
```
1 0 0 1 1 0 0 1 0 1 1 0 0 1 1 0
1 0 0 1 0 1 1 0 0 1 1 0 1 0 0 1
1 0 0 1 0 1 1 0 1 0 0 1 0 1 1 0
1 0 1 0 0 1 0 1 1 0 1 0 0 1 0 1
```

FIG. 5B i = 16

| $PER_1$ $PER_2$ | $PER_{16}$ |

FIG. 5C

APPARATUS AND METHOD FOR ADAPTIVE CONTROL

FIELD OF THE INVENTION

The invention relates to variable control and, in particular, to high-speed adaptive control.

BACKGROUND OF THE INVENTION

Many systems, including communications systems, employ variable control to adjust system parameters in order to accommodate changes in the system's environment. Such adaptive control may be employed in process flow, manufacturing, communications, or any other field in which a control parameter varies over time and adjustments are made to control variables (such as tap weights, in digital control systems) to accommodate those changes.

For example, a receiver for a ten gigabit per second (10 Gbps) optical communications system must contend with polarization mode dispersion, uncompensated chromatic dispersion, and imperfect channel filtering, all of which create inter-symbol Interference. The magnitude of the inter-symbol interference attributable to polarization mode dispersion can vary significantly, and the time scale of the variations ranges from milliseconds to hours at a time. To successfully compensate for such time-dependent inter-symbol interference, a receiver must adaptively compensate for distortions in a manner that accommodates both the magnitude of the distortion and the rate of change of the distortion. Without such compensation the receiver suffers from a power penalty and a corresponding decrease in span length. A telecommunications system employing such uncompensated receivers would be required to regenerate the communications signals at shorter intervals, with concomitant increases in fixed and recurring costs and reduced system reliability.

Electronic equalizers have been used extensively in data transmission systems to compensate for the conditions that create inter-symbol interference. Real-time adaptive equalizers are employed to compensate for time-varying distortions, such as polarization mode dispersion, to guide a receiver to convergence during, and without interruption of, the payload signal transmission. Conventional adaptive controllers used in communications systems typically require the digitization of the payload signal and/or a significant amount of signal processing at the transmission speed of the payload signal. However, because of their complexity, conventional approaches which employ, for example, zero-forcing or least-mean-square algorithms are incapable of compensating for time-varying distortions in high speed signals. That is, now, and for the foreseeable future, controllers cannot operate at sufficient speeds to employ such algorithms on signals such as 10 Gbps signals. Furthermore, even if the speed of circuitry increases sufficiently to permit an equalizer to employ such algorithms on signals operating at these speeds, the demand for operation at even higher speeds will preclude the use of such complex algorithms in future real time adaptive equalizers.

A system and method for effecting relatively simple adaptive control would be highly desirable, not only in high speed communications, but in all adaptive control systems that could take advantage of high-speed convergence of control parameter values.

SUMMARY

An adaptive controller generates a sequence of dither signals for each of a plurality of control parameters. Each dither signal sequence is uncorrelated with every other dither signal sequence. Each nominal control signal has the first of its respective dither signal values simultaneously summed with it to form the control parameter values used by the controller. Updated control signals are applied to the controller outputs and a performance measure is taken and stored. The updated control signals are applied in parallel, in the sense that the performance measure is taken after a plurality of control signals are applied and the performance measure reflects a plurality of updated control signals. The second signals in the dither control sequences are then summed with their respective nominal controls and applied in parallel to the controller and a second performance measure is taken and stored. This process is repeated for the length of the dither control signal sequence to yield a sequence of performance measurements. The sequence of performance measurements is correlated with each of the dither sequences, forming sequences of correlator outputs, one for each control signal. Each correlator output sequence is integrated and, depending upon the value of a correlator's integration output, the corresponding nominal signal has it's dither value added to or subtracted from it to form the respective, updated control values. Because the nominal control values are updated and their effects measured in parallel, an adaptive controller in accordance with the principles of the present invention may successfully adapt to controlling high speed processes.

In a communications application, such performance measures may include such things as error rates provided by forward error correction, a measure of spectral shape, or a measure of the baseband eye pattern. The control parameters may be tap weights, for example. The dither signal is small relative to the nominal control signal. For example, in an illustrative embodiment, the dither signal falls within the range of 1% to 10% of the nominal control value. In an illustrative embodiment for high speed optical communications applications, an adaptive controller in accordance with the principles of the present invention operates to control an adaptive equalizer within an optical receiver. The adaptive controller monitors the receiver's eye pattern and adjusts the equalizer taps in order to maintain an acceptable bit error rate. Such tap adjustments compensate for time-varying degradations in the communications system's transmission path, such as inter-symbol interference due to polarization mode dispersion.

In particular, each tap is fed a dither signal which is summed with the tap's nominal control value, or weight. Each of the dither signals is also fed to a separate correlator where the dither signal is correlated with a measure of performance based on the receiver's eye pattern. Each of the correlator outputs is integrated to form a nominal control value, or tap weight, for each of the respective taps. The dither signals, in addition to being small compared to the value of the nominal control signal, are substantially random, having substantially no correlation with one another. Consequently, the effect of dither signals provided to one tap will have substantially no effect on another tap and the taps are dithered in parallel and their effects on the performance measure is evaluated in parallel. In operation the correlator outputs are integrated, driving the controls until the average value at the correlator output due to other dither signals is driven to zero, indicating that no further improvements are possible. In this manner all controls are adjusted simultaneously, allowing for a simultaneous convergence to a control state which remains stable until further adaptations to variations in the control process are necessary.

Various codes may be employed to produce the dither signals. For example, time-shifted samples of a pseudo— noise sequence may be used to generate the dither signals. Such sequences have the advantages of being relatively simple to generate and, if the sequences are long enough, they are substantially orthogonal. That is, each dither signal will have little correlation with other dither signals generated in this manner. However, when using such dither signals, the outputs of the correlators must be integrated for a relatively long period in order to average the effects of other dither signals to zero. In high speed applications other, finite length orthogonal, codes, such as Walsh codes, may be employed to generate the dither signals. In each such finite-length code the correlation of any code in the series with any other code in the series over the length of the code is zero.

BRIEF DESCRIPTION OF THE DRAWINGS

The above and further features, aspects, and advantages of the invention will be apparent to those skilled in the art from the following detailed description, taken together with the accompanying drawings in which:

FIGS. 5A, 5B, and 5C are illustrative tables such as might be developed for use in the processes described in the discussion related to the flow charts of FIGS. 3 and 4.

DETAILED DESCRIPTION

Figure 1:
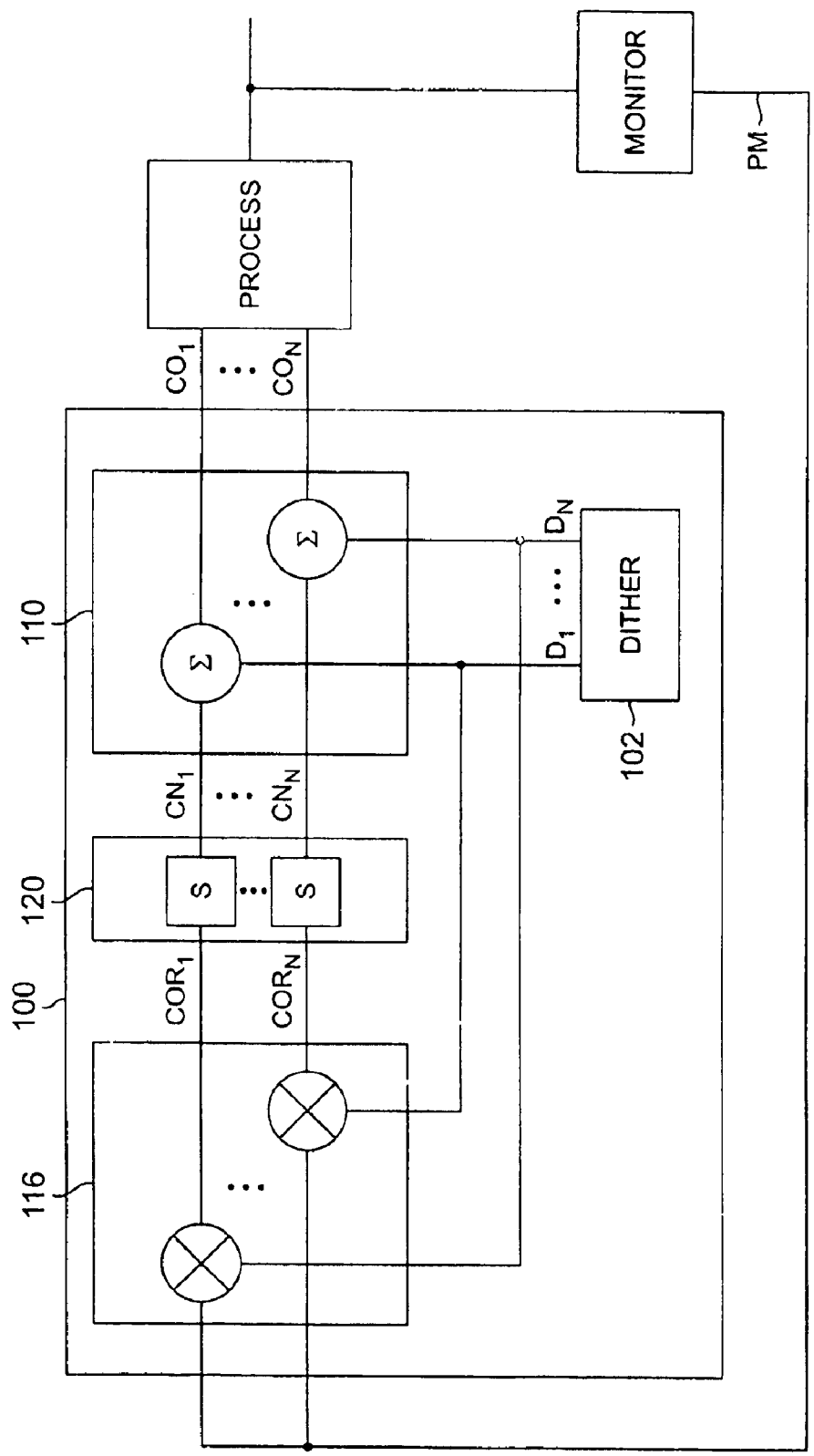
FIG. 1 is a conceptual block diagram of an adaptive controller in accordance with the principles of the present invention.

The conceptual block diagram of FIG. 1 illustrates the components of an adaptive controller 100 in accordance with the principles of the present invention. A dither generator 102 generates dither signals $D_1$ through $D_N$ for a plurality of nominal control parameters $CN_1$ through $CN_N$. In an illustrative embodiment, the nominal control parameter values are developed during a calibration process, which might take place during production of the controller, for example. During this process, the controller is allowed to adapt to a "known good" signal. The parameter values resulting from this adaptation are stored and used as the control values for power on initial conditions. A summer 110 adds the respective nominal $CN_1$ through $CN_N$ and dither $D_1$ through $D_N$ signals to form output control signals $CO_1$ through $CO_N$. A correlator 116 correlates each of the dither $D_1$ through $D_N$ signals simultaneously with a system performance measure PM, yielding correlator outputs $COR_1$ through $COR_N$. The performance measure PM may be, in a communications application for example, a forward error correction derived error rate, a measure of spectral shape, or a measure of a baseband eye pattern. An integrator 120 integrates the outputs of the correlator 116, $COR_1$ through $COR_N$, to form the respective nominal control signals $CN_1$ through $CN_N$. The output control signals $CO_1$ through $CO_N$ may be tap weights, for example. Each dither signal $D_1$ through $D_N$ is small relative to its respective nominal control signal $CN_1$ through $CN_N$. For example, in an illustrative embodiment, the dither signal falls within the range of 1% to 10% of the nominal control value. The dither signals $D_1$ through $D_N$, in addition to being small compared to the value of the nominal control signal, are substantially random, having substantially no correlation with one another. Consequently, the effect of dither signals provided to one tap will have substantially no effect on another tap.

In operation the correlator outputs $COR_1$ through $COR_N$ are integrated, driving the controls until the average value at the correlator output due to other dither signals is driven to zero, indicating that no further improvements are possible. That is, in the steady state, where little adaptation is required, the control signals will settle to a point where they contiuously dither +1/−1 about the steady state value, and, consequently, the average correlator output is driven to zero. In this manner all control signals, $CO_1$ through $CO_N$, are adjusted simultaneously, allowing for a simultaneous convergence to a "tracking" control state.

Various codes may be employed to produce the dither signals. For example, time-shifted samples of a pseudo—noise sequence may be used to generate the dither signals. Such sequences have the advantages of being relatively simple to generate. If the sequences are long enough, they are substantially orthogonal. That is, if each of the sequences is long enough, each dither signal will have little correlation with other dither signals generated in this manner. However, when using such sequences to generate dither signals, the outputs of the correlators must be integrated for a relatively long period in order to average the effects of other dither signals to zero. In high speed applications other, finite length, orthogonal, codes, such as Walsh codes, may be employed to generate the dither signals. Such a process is described in greater detail in the discussion related to FIG. 4.

Figure 2:
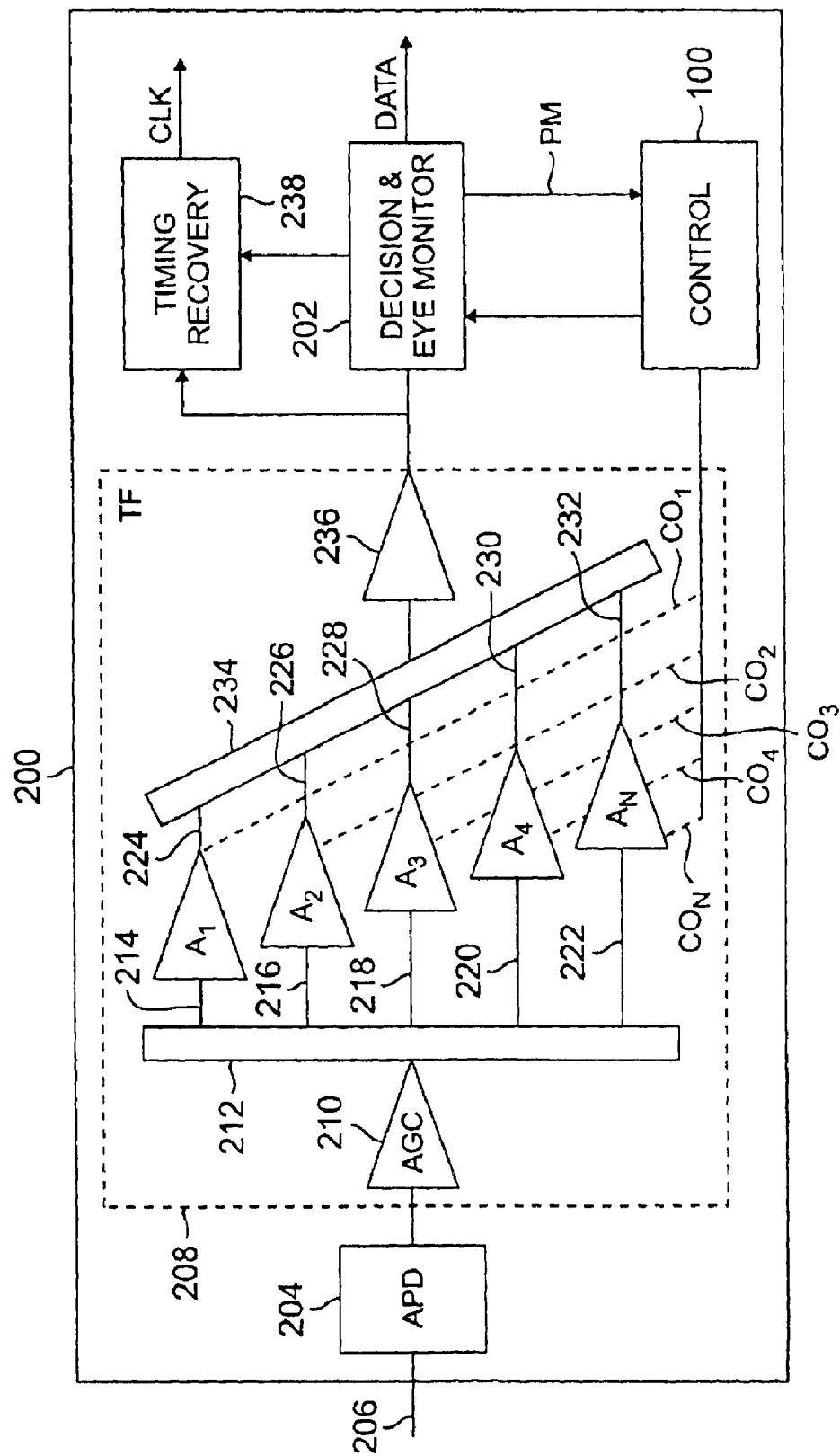
FIG. 2 is a conceptual block diagram of an adaptive controller in accordance with the principles of the present invention in use within a high speed optical receiver.

In an illustrative embodiment, an adaptive controller in accordance with the principles of the present invention may be used in conjunction with an optical receiver 200, as illustrated by the conceptual block diagram of FIG. 2. The optical receiver 200 may operate, for example, in a 10 Gbps transmission system. In such a system both first and second order polarization mode dispersion are a significant source of inter-symbol interference. First-order polarization mode dispersion may be described by two variables: Differential Group Delay (DGD), and the fraction of the power in the fast principal state (gamma, γ). In a transmission system, both DGD and gamma vary dynamically and, as discussed in greater detail in relation to Figure four, the adaptive controller 100 may be employed to mitigate the effects of DGD and gamma.

An avalanche photo diode (APD) module 204 converts an input optical signal received at the optical input 206 to an electrical signal. In this illustrative embodiment, the avalanche photo diode module 204 is operated in the linear region. The electrical signal from the avalanche photo diode module 204 is transmitted to a transversal filter (TF) 208 through a gain-controlled amplifier 210. The amplifier 210 feeds a N-way resistive splitter 212. Each branch of the splitter connects via transmission lines 214, 216, 218, 220, and 222 respective gain controlled tap weight amplifiers $A_1$, $A_2$, $A_3$, $A_4$, and $A_N$. The transmission lines vary in length by increments of 50 ps. The outputs of the amplifiers $A_1$, $A_2$, $A_3$, $A_4$, and $A_N$ are connected through respective transmission lines 224, 226, 228, 230, and 232 to a 5-way resistive combiner 234. The transmission lines 224, 226, 228, 230, and 232 vary in increments of 50 ps. For example, the signal into the fifth amplifier is delayed by 200 ps relative to the first and the signal into the combiner from the fifth amplifier is delayed by 400 ps relative to that into the combiner from the first amplifier. The output from the combiner 234 is passed to an amplifier 236. A timing recovery unit 238 extracts the timing signal required for the data decision and eye monitor 202.

Each of the amplifiers $A_1$, $A_2$, $A_3$, $A_4$, through $A_N$ is controlled by respective control outputs $CO_1$ through $CO_N$, as described in the discussion related to FIG. 1. In this illustrative embodiment, the controller 100 can vary the tap weight amplifiers $A_1$, $A_2$, $A_3$, $A_4$, through $A_N$, via control outputs $CO_1$ through $CO_N$ through a gain range of 40 dB and phase shifts of 0 or 180 degrees. The decision and eye monitor circuit 202 makes the data decisions and also provides a measure of the eye opening. As will be explained in greater detail in the discussion related to FIG. 3, the controller 100 employs the eye opening measurement from the decision and eye monitor circuit 202 to adjust the gains of the tap weight amplifiers $A_1$, $A_2$, $A_3$, $A_4$, through $A_N$ to minimize inter-symbol-interference within the optical signal received at the input 206. The controller 100 also employs the eye monitor output in setting a main decision threshold. In this illustrative embodiment, the eye monitor employs a main threshold detector and two offset threshold detectors. The system bit error rate is determined by the main threshold detector and the offset detectors generate pseudo-errors (attributable to the added dither signals $D_1$ through $D_N$).

The controller adjust the offset thresholds to produce a predetermined pseudo error rate, fixes these threshold values, dithers control signals, counts the pseudo-errors, adjusts the control parameters, then adjusts the offset thresholds to produce the predetermined pseudo-error rate once again. In this illustrative embodiment, the offset thresholds are set to produce a $10^{-4}$ pseudo-error rate. In this manner, the offset thresholds are calibrated at $10^{-4}$ pseudo-error rate and pseudo-errors are counted in order to derive control information for main threshold level adjustments, timing phase adjustments, and equalizer tap adjustments. As described in the discussion related to FIG. 1, the adaptive controller 100 monitors the receiver's eye size and adjusts the equalizer taps $A_1$, $A_2$, $A_3$, $A_4$, through $A_N$ in order to create the largest eye opening possible. This corresponds to the best bit error rate attainable under existing channel conditions. Such tap adjustments compensate for time-varying degradations in the communications system's transmission path, such as inter-symbol interference due to polarization mode dispersion.

Figure 3:
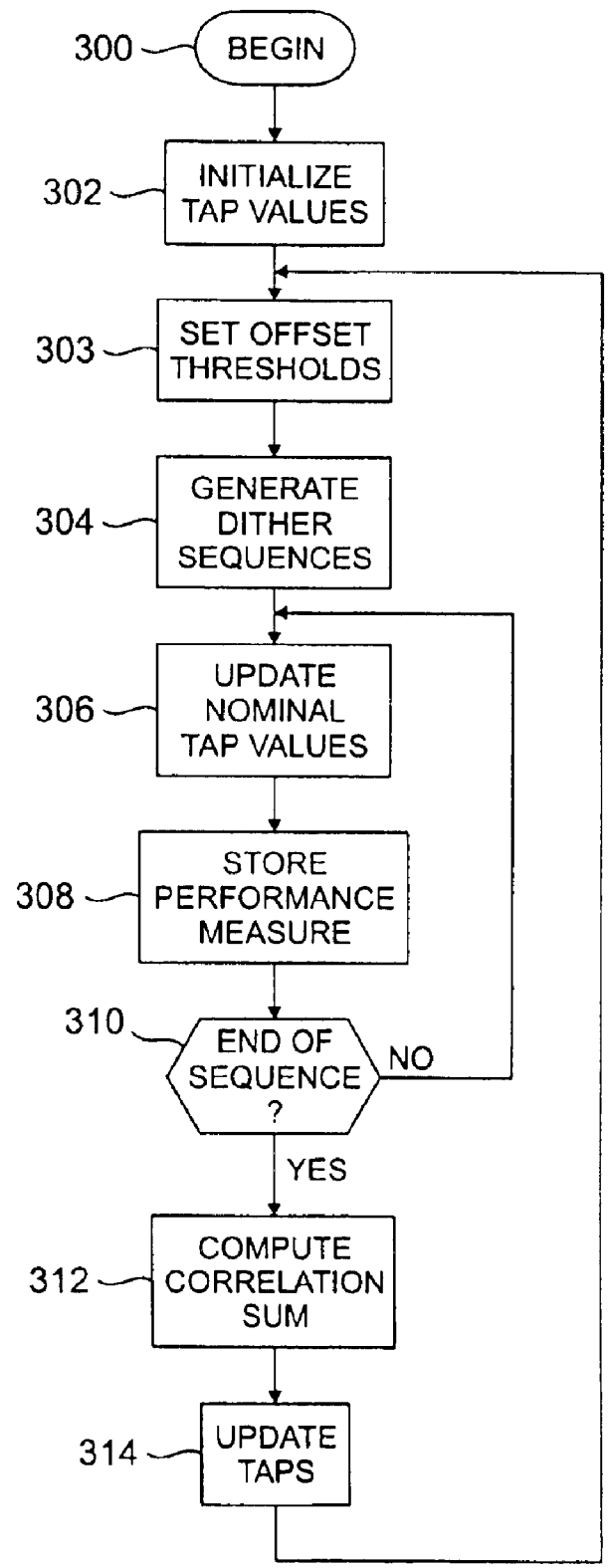
FIG. 3 is a high-level flow chart of a process by which adaptive control in accordance with the principles of the present invention is effected.

The flow chart of FIG. 3 illustrates the process of adaptive control in accordance with the principles of the present invention in the context of an application in which four control parameters are dithered using finite length orthogonal codes. Such dithering adjusts the control parameters to variations in the process being controlled. In this illustrative embodiment, the four control parameters are tap weights in an adaptive receiver such as the one described in the discussion related to FIG. 2. In this illustrative embodiment the process begins in step 300 and proceeds to step 302 where the four tap values are initialized. The initial tap values may be selected using historical data, which may be derived from the performance of other receivers, for example, and which produces stable results across a variety of receivers. As will be described, after using these initial values, the controller adapts to provide control parameters that are appropriate for the operation of each individual receiver. In this illustrative embodiment, these parameter values are then stored in nonvolatile storage for use when the receiver is started at some time in the future. From step 302 the process proceeds to step 303, where the offset thresholds are set to produce a predetermined pseudo-error rate.

From step 303 the process proceeds to step 304 where the controller generates a sequence of dither values for each of the taps, with each sequence of dither values being orthogonal with all the other control parameter dither sequences. The sign of the dither value is determined by the orthogonal code values (1=positive, 0=negative). The dither value magnitudes are design choices, related to the degree of adjustment desired for each control parameter update. As will be described in greater detail in the discussion related to FIG. 4, finite length orthogonal codes, such as Walsh codes, may be employed to produce such sequences. From step 304 the process proceeds to step 306, where the four nominal tap values are updated by adding the ith dither value of each of the four dither sequences to respective current nominal tap values. Having updated the four tap values in parallel, the process proceeds to step 308, where a performance measurement it taken and stored, forming the ith performance measure of a sequence corresponding to the i dither values of the dither sequences. The process then proceeds to step 310 where the controller determines whether all the dither signals in the j dither sequences have been applied to the control signals and performance measurements taken corresponding to those dither signal values. If there are more dither signals to be applied, the process returns to step 306 and proceeds from there as just described.

If the final dither values in the control parameter sequences have been applied, and corresponding performance measurements taken and stored, the process proceeds to step 312. In step 312, the controller correlates the sequence of performance measurements with each dither sequence and sums the results to yield a correlation sum for each of the j control parameters. From step 312, the process proceeds to step 314 where control parameter values are updated by adding or subtracting respective dither values to corresponding tap values. That is, respective dither values are added to nominal tap values for those tap values corresponding to a negative correlation sum computed in step 312 and respective dither values are subtracted from the nominal tap values for those tap values corresponding to a positive correlation sum computed in step 312. From step 314, the process returns to step 304 and proceeds from there as previously described.

Figure 4A:
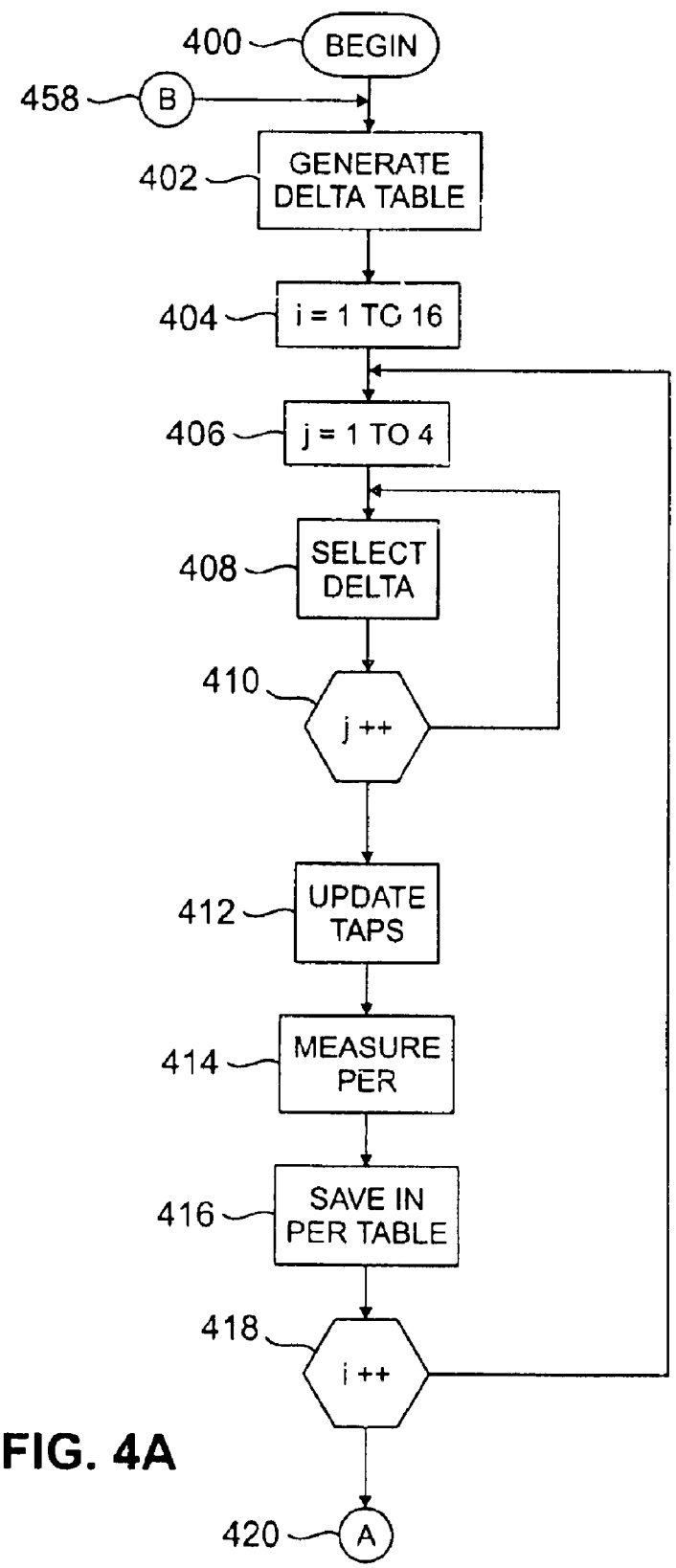
FIGS. 4A and 4B are more detailed flow charts of the process by which adaptive control in accordance with the principles of the present invention is effected.

The flow chart of FIG. 4A provides a more detailed view of that section of a control process in accordance with the principles of the present invention related to generating a dither sequence, updating nominal tap values and storing a performance sequence, as described more broadly in the discussion related to FIG. 3. The process begins in step 400 and proceeds from there to step 402 where a table of delta, or dither, values is generated. Positive and negative delta values are stored for each of the j taps, or control outputs. A delta table is shown conceptually in FIG. 6A. In an illustrative four-tap example, positive and negative delta values are stored for each of four taps, yielding a table with entries $+\Delta_1$, $-\Delta_1$; $+\Delta_2$, $-\Delta_2$; $+\Delta_3$, $-\Delta_3$; and $+\Delta_4$, $-_4$, respectively corresponding to tap values TAP1, TAP2, TAP3, and TAP4. The magnitude of each delta value, $\Delta_j$, is independent of the other delta values, is generally in the range of 1–10% of the magnitude of the corresponding nominal tap value, $TAP_j$, and is determined as a design choice related to the degree to which it is desired to adjust tap values with each update. After creating the delta table in step 402, the process proceeds to steps 404 and 406 where respective indices I and j are set for the number of bits in the orthogonal codes and number of tap values being controlled. The table of FIG. 6B illustrates a 16×4 (i×j) array of code values, $CV_ij$, for an illustrative four-tap, sixteen-bit Walsh code embodiment.

After setting the indices related to the number of bits in the orthogonal codes and the number of taps being updated in steps 404 and 406, respectively, the process proceeds to step 408, where delta values are selected, depending upon corresponding code values. In this illustrative embodiment:

$\Delta_{ij}=+\Delta_j$, if $CV_{ij}=1$ $\Delta_{ij}=+\Delta_j$, if $CV_{ij}=0$

Step 410 returns the process to step 408, for j from 1 to 4. Consequently, for example, in the first pass through steps 406, 408, and 410, delta values: $+\Delta_1$,; $+\Delta_2$,; $+\Delta_3$,; and $+\Delta_4$, would be selected, because $CV_{11}$, $CV_{12}$, $CV_{13}$, and $CV_{14}$ have the values 1, 1, 1, and 1. On the second pass through steps 406, 408, and 410, delta values: $-\Delta_1$; $-\Delta_2$; $-\Delta_3$; and $-\Delta_4$ would be selected, because $CV_{21}$, $CV_{22}$, $CV_{23}$, and $CV_{24}$ have the values 0, 0, 0, and 0 and so on.

After selecting four delta values in the step 406 to step 410 loop, the process proceeds to step 412 where all four taps are updated by adding the delta values selected in the four passes through the loop to the nominal tap values. Since these delta values are relatively small, the updated nominal tap values are changed a small amount. After updating the nominal tap values, the process proceeds to step 414 where a pseudo-error rate is measured. That is, in this illustrative embodiment an eye pattern provides the performance measure which the controller 100 employs to adjust control parameters: tap weights in this example. The eye monitor circuit includes a main threshold detector which determines the system's bit error rate. Additionally, high and low threshold detectors generate pseudo-errors. The offset threshold detectors, that is, the high and low threshold detectors, provide a measure of the current eye opening and they are adjusted to ensure performance within the bounds of a predetermined acceptable bit error rate. As previously mentioned, the dither signal is selected to be relatively small (generally 1–10% of the respective tap value), so as not to excessively increase the receiver's bit error rate, but large enough to affect the pseudo error rate. Additionally, the high and low offset thresholds are set to values that yield sufficient sensitivity to dither signals, $10^{-4}$ PER, in this illustrative embodiment.

From step 414, the process proceeds to step 416, where the performance measure related to the tap values updated by the ith set of delta values is stored in the ith location of a pseudo-error rate table $PER_i$, as illustrated in the table of FIG. 5C. The process proceeds to step 418, which returns the process to step 406 until all i sets of tap delta values are applied to the taps in parallel and pseudo-error values are obtained and stored, at which time this portion of the process is completed and the process proceeds in step 420 through connector A to step 422 of FIG. 4B. By updating and applying the tap values in parallel, as in step 412, and determining the effect of the updates in parallel in step 414, a controller in accordance with the principles of the present invention may operate on higher-speed control processes than would be he case if each control parameter were updated, followed by a performance measure, followed by another tap update, followed by another performance measure, etc.

Figure 4B:
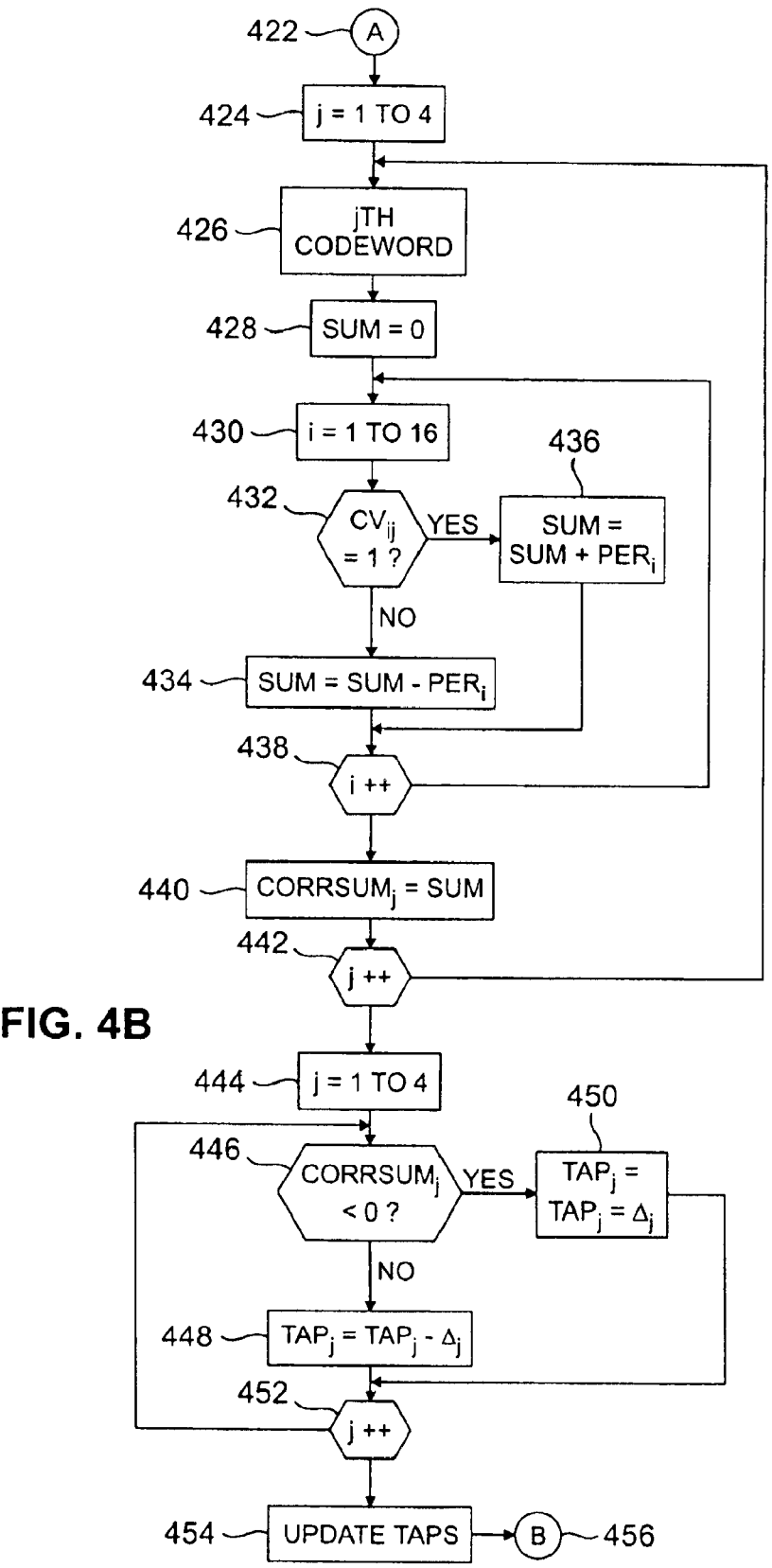

Turning now to the flow chart of FIG. 4B, the process proceeds from connector A 422 to step 424 where an index j for the number of taps (four in this example) is established. From step 424 the process proceeds to step 426 where the jth codeword, illustratively row 1 containing values $CV_{i1}$ of the code table of FIG. 5B, is selected. From step 426 the process proceeds to step 428 where a variable SUM is initialized to zero. From step 428 the process proceeds to step 430 where an index I for the number of bits in each codeword (sixteen in this example) is established. From step 430 the process proceeds to the decision block of step 432 where it is determined whether the code value is equal to one, and if it is, the process proceeds to step 436 where the pseudo-error value $PER_i$ stored in step 416 is added to the variable SUM. If, on the other hand, it is determined in step 432 that the vale $CV_{ij}$ is not equal to one, the process proceeds to step 434 where the pseudo-error value $PER_i$ stored in step 416 is subtracted from the variable SUM. The process proceeds to step 438 from either step 436 or 434 and returns to step 432 until each of the i pseudo error values, PERi, stored in the pseudo-error table is correlated in this manner with each code value $CV_{ij}$ corresponding to the jth tap and, once this is completed, the process proceeds to step 440 where the correlation value for the jth tap, $CORRSUM_j$ is set equal to the result, SUM, of the loop encompassing steps 432, 434, 436, and 438.

In step 442 the controller determines whether the a correlation sum, $CORRSUM_j$ has been computed for all j of the TAPs and, if not, the process returns to step 426 and from there as previously described. If a correlation sum, $CORRSUM_j$ has been computed for all j of the TAPs, the process proceeds from step 442 to step 444 where an index j through each of the four TAP values is initialized to repeat through step 452. From step 444 the process proceeds to step 446 where the controller determines whether the value of $CORRSUM_j$ is negative and, if so, the process proceeds to step 448 where the corresponding tap value $TAP_j$ is updated by subtracting the corresponding tap delta value from the current tap value $TAP_j$. On the other hand, if the controller determines in step 446 that the value of $CORRSUM_j$ is zero or greater, the process proceeds to step 450 where the corresponding tap value $TAP_j$ is updated by adding the corresponding tap delta value to the current tap value $TAP_j$. From step 452 the process proceeds to step 454 where all the actual output control values, the tap values, are updated to the values formed in the loop from step 444 to 452. From step 454 the process returns through connectors B 456 of FIG. 4B and B 458 of FIG. 4A to step 402.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An adaptive controller comprising: a dither signal generator configured to generate a sequence of uncorrelated dither signals for each of a plurality of control signals and to apply the dither signals in parallel to all the control signals; a performance measurement apparatus configured to measure a performance measure corresponding to each parallel application of control signals through the sequences and to store the resulting sequence of performance measurements; a correlator configured to correlate the sequence of performance measures with each of the dither sequences to form a sequence of correlator outputs for each of the control signals; an integrator configured to integrate each of the sequences of correlator output sequences; and a control signal update device configured to add to or subtract from the control signal values and the values of their corresponding dither signal, the adding or subtracting depending upon the value of the corresponding integrated correlator output.

2. The adaptive controller of claim 1 wherein the performance measurement apparatus is a forward error correction apparatus.

3. The adaptive controller of claim 1 wherein the performance measurement apparatus is a spectral shape measurement apparatus.

4. The adaptive controller of claim 1 wherein the performance measurement apparatus is a baseband eye pattern measurement apparatus.

5. An adaptive equalizer comprising: a splitter connected to receive and split into portions of a communications signal; a plurality of gain controlled amplifiers each connected to receive and amplify one of said split portions of a signal; a combiner connected to combine the amplified split portions of the signal; a decision and eye monitor circuit connected to receive the combined signal and to produce an error signal; and an adaptive controller configured to receive the error signal from the decision and eye monitor circuit and to produce control signals which control the gain of said gain controlled amplifiers, the adaptive controller comprising: a dither signal generator configured to generate a sequence of uncorrelated dither signals for each of a plurality of control signals and to apply the dither signals in parallel to all the control signals; a performance measurement apparatus configured to measure a performance measure corresponding to each parallel application of control signals through the sequences and to store the resulting sequence of performance measurements; a correlator configured to correlate the sequence of performance measures with each of the dither sequences to form a sequence of correlator outputs for each of the control signals; an integrator configured to integrate each of the sequences of correlator output sequences; and a control signal update device configured to add to or subtract from the control signal values and the values of their corresponding dither signal, the adding or subtracting depending upon the value of the corresponding integrated correlator output.

6. The adaptive equalizer of claim 5 wherein the performance measurement apparatus is a forward error correction apparatus.

7. The adaptive equalizer of claim 5 wherein the performance measurement apparatus is a spectral shape measurement apparatus.

8. The adaptive equalizer of claim 5 wherein the performance measurement apparatus is a baseband eye pattern measurement apparatus.

9. A method for adaptive control of a process comprising the steps of: (A) simultaneously applying to a plurality of control signals corresponding members of sequences of uncorrelated dither signals; (B) measuring a performance of the process corresponding to each simultaneous application of the dithered control signals and repeating the performance measurement through the sequential, parallel application to the control signals; (C) storing the resulting sequence of performance measurements; (D) correlating the sequence of performance measures with each of the dither sequences to form a sequence of correlator outputs for each of the control signals; (E) integrating each of the sequences of correlator output sequences; and (F) adding to or subtracting from the control signal values and the values of their corresponding dither signal, the adding or subtracting depending upon the value of the corresponding integrated correlator output.

10. The method of claim 9 wherein the step (B) of measuring performance comprises the step of: (B1) monitoring a forward error correction apparatus.

11. The method of claim 9 wherein the step (B) of measuring performance comprises the step of: (B2) measuring the spectral shape of an output signal.

12. The method of claim 9 wherein the step (B) of measuring performance comprises the step of: (B3) measuring a baseband eye pattern of an output signal.

13. A method for adaptive equalization comprising the steps of: (A) receiving and splitting into portions a communications signal; (B) amplifying with gain controlled amplifiers each of said split portions of a signal; (B) combining the amplified split portions of the signal; (C) receiving the combined signal and producing an error signal; and (D) adaptively controlling the control signals which control the gain controlled amplifiers by: (E) simultaneously applying to the plurality of control signals corresponding members of sequences of uncorrelated dither signals; (F) measuring the performance of the process corresponding to each simultaneous application of the dithered control signals and repeating the performance measurement through the sequential, parallel application to the control signals; (G) storing the resulting sequence of performance measurements; (H) correlating the sequence of performance measures with each of the dither sequences to form a sequence of correlator outputs for each of the control signals; (I) integrating each of the sequences of correlator output sequences; and (J) adding to or subtracting from the control signal values and the values of their corresponding dither signal, the adding or subtracting depending upon the value of the corresponding integrated correlator output.

14. The method of claim 13 wherein the step (F) of measuring performance comprises the step of: (F1) monitoring a forward error correction apparatus.

15. The method of claim 13 wherein the step (F) of measuring performance comprises the step of: (F2) measuring the spectral shape of an output signal.

16. The method of claim 13 wherein the step (F) of measuring performance comprises the step of: (F3) measuring a baseband eye pattern of an output signal.

17. The method of claim 16 wherein the step (E) of applying a dither signal includes the step of: (E1) generating a dither sequence for each of a plurality of control outputs using a different code sequence for each of the control parameters, each of the codes sequences being substantially orthogonal to every of the other code sequences.

18. The method of claim 17 wherein the step (E1) of generating a dither sequence includes the step of: (E2) employing finite length orthogonal codes for the code sequences.

19. The method of claim 17 wherein the step (E1) of generating a dither sequence includes the step of: (E3) employing Walsh codes for the code sequences.

* * * * *